United States Patent
Romano et al.

(10) Patent No.: US 9,951,808 B2
(45) Date of Patent: Apr. 24, 2018

(54) ELASTOMERIC SPHERICAL BEARING ASSEMBLY AND STRUCTURAL MEMBER INCORPORATING THE SAME

(71) Applicant: Bell Helicopter Textron Inc., Fort Worth, TX (US)

(72) Inventors: Peter Q. Romano, Fort Worth, TX (US); Frank B. Stamps, Colleyville, TX (US); Stephen R. Johnston, Fort Worth, TX (US); Peter H. Kintzinger, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/481,177

(22) Filed: Sep. 9, 2014

(65) Prior Publication Data

US 2015/0139575 A1 May 21, 2015

Related U.S. Application Data

(60) Provisional application No. 61/904,531, filed on Nov. 15, 2013.

(51) Int. Cl.
*F16C 11/06* (2006.01)
*B64C 27/00* (2006.01)

(52) U.S. Cl.
CPC ........ *F16C 11/0695* (2013.01); *B64C 27/001* (2013.01); *F16C 11/0628* (2013.01); *F16C 11/0652* (2013.01); *B64C 2027/002* (2013.01); *F16C 11/0614* (2013.01); *F16C 2326/43* (2013.01)

(58) Field of Classification Search
CPC ... B64C 27/35; F16C 2326/43; F16C 11/0695
USPC .................................. 267/140; 384/470, 477
See application file for complete search history.

(56) References Cited

U.S. PATENT DOCUMENTS

| | | | | |
|---|---|---|---|---|
| 1,923,601 A | * | 8/1933 | Weaver | F16C 11/04 403/133 |
| 2,048,972 A | * | 7/1936 | Scheffler | F16C 19/385 384/498 |
| 2,766,079 A | * | 10/1956 | Browne | F16C 11/0614 384/209 |
| 3,249,338 A | * | 5/1966 | Malan | E04G 21/08 285/263 |
| 3,806,216 A | * | 4/1974 | Orkin | F16C 11/0614 384/297 |
| 3,874,050 A | * | 4/1975 | White | B23P 15/003 29/898.047 |
| 4,033,019 A | * | 7/1977 | Orkin | B23K 15/04 29/898.047 |
| 4,080,015 A | * | 3/1978 | Greby | F16C 23/045 277/507 |
| 4,116,504 A | * | 9/1978 | Cass | F16C 11/0614 384/210 |

(Continued)

*Primary Examiner* — Anna M Momper
*Assistant Examiner* — Mahbubur Rashid
(74) *Attorney, Agent, or Firm* — Lightfoot & Alford PLLC

(57) ABSTRACT

A bearing assembly can include a top retainer; a middle retainer having a first concave spherical surface; a bottom retainer having a second concave spherical surface; a spherical ball member; and an elastomeric member coupled to the first concave spherical surface, the second concave spherical surface, and an outer surface of the spherical ball member.

16 Claims, 5 Drawing Sheets

(56) References Cited

U.S. PATENT DOCUMENTS

| | | | | |
|---|---|---|---|---|
| 4,304,252 A | * | 12/1981 | Stanton | F16K 5/0605 |
| | | | | 137/123 |
| 4,386,869 A | * | 6/1983 | Smith | F16C 11/0652 |
| | | | | 403/134 |
| 4,440,186 A | * | 4/1984 | Lottner | A45B 9/04 |
| | | | | 135/84 |
| 4,722,631 A | * | 2/1988 | Tagami | F16C 11/0633 |
| | | | | 403/133 |
| 5,601,408 A | * | 2/1997 | Hunter | B64C 27/35 |
| | | | | 267/141.1 |
| 5,915,842 A | * | 6/1999 | Redinger | F16F 1/393 |
| | | | | 264/242 |
| 2008/0218006 A1 | * | 9/2008 | Dimascio | F03D 11/0008 |
| | | | | 310/425 |
| 2014/0086518 A1 | | 3/2014 | Wright | |

\* cited by examiner

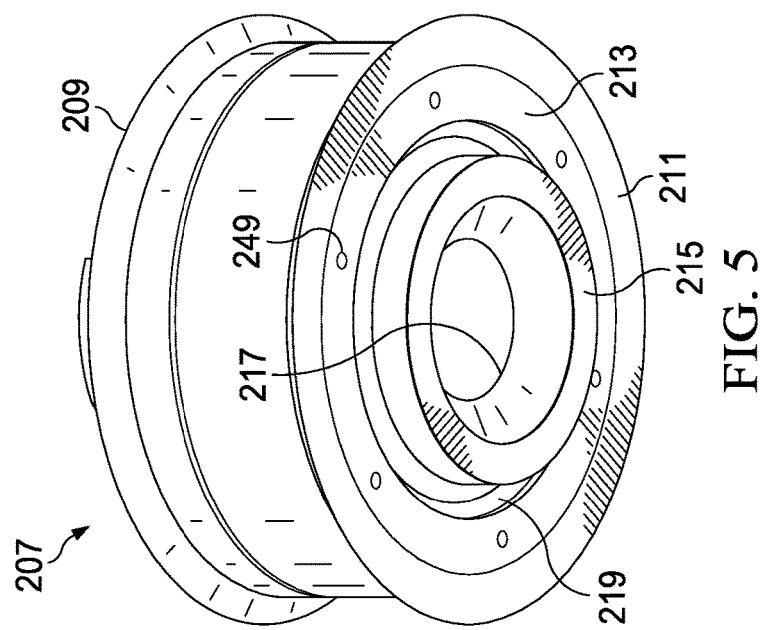
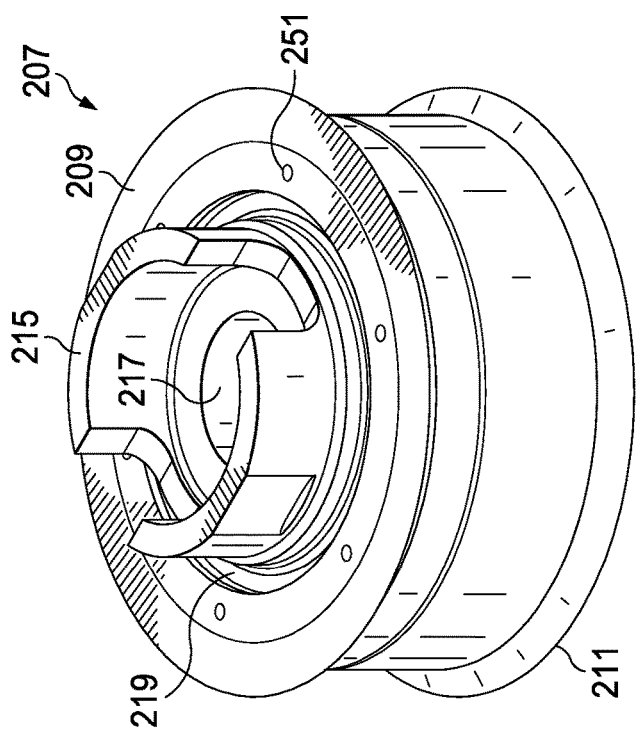
FIG. 5
FIG. 4

ELASTOMERIC SPHERICAL BEARING ASSEMBLY AND STRUCTURAL MEMBER INCORPORATING THE SAME

BACKGROUND

Technical Field

The present disclosure relates to an elastomeric spherical bearing assembly and structural member incorporating the same.

Description of Related Art

Conventional elastomeric spherical bearings can include an elastomeric member that is rubber vulcanized directly into the body of a structural housing such as a link, or other housing structure that incorporates the spherical bearing. This process of manufacturing is expensive and time-consuming as the entire link or structure is involved. Further, if the elastomeric member wears out, the entire link must be reworked at a specialized facility, or replaced.

There is a need for an improved elastomeric spherical bearing assembly that is less expensive to manufacture and maintain.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 4 is a perspective view of a bearing assembly, according to an example embodiment;

FIG. 5 is a perspective view of a bearing assembly, according to an example embodiment.

DESCRIPTION OF THE PREFERRED EMBODIMENT

Illustrative embodiments of the embodiments are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
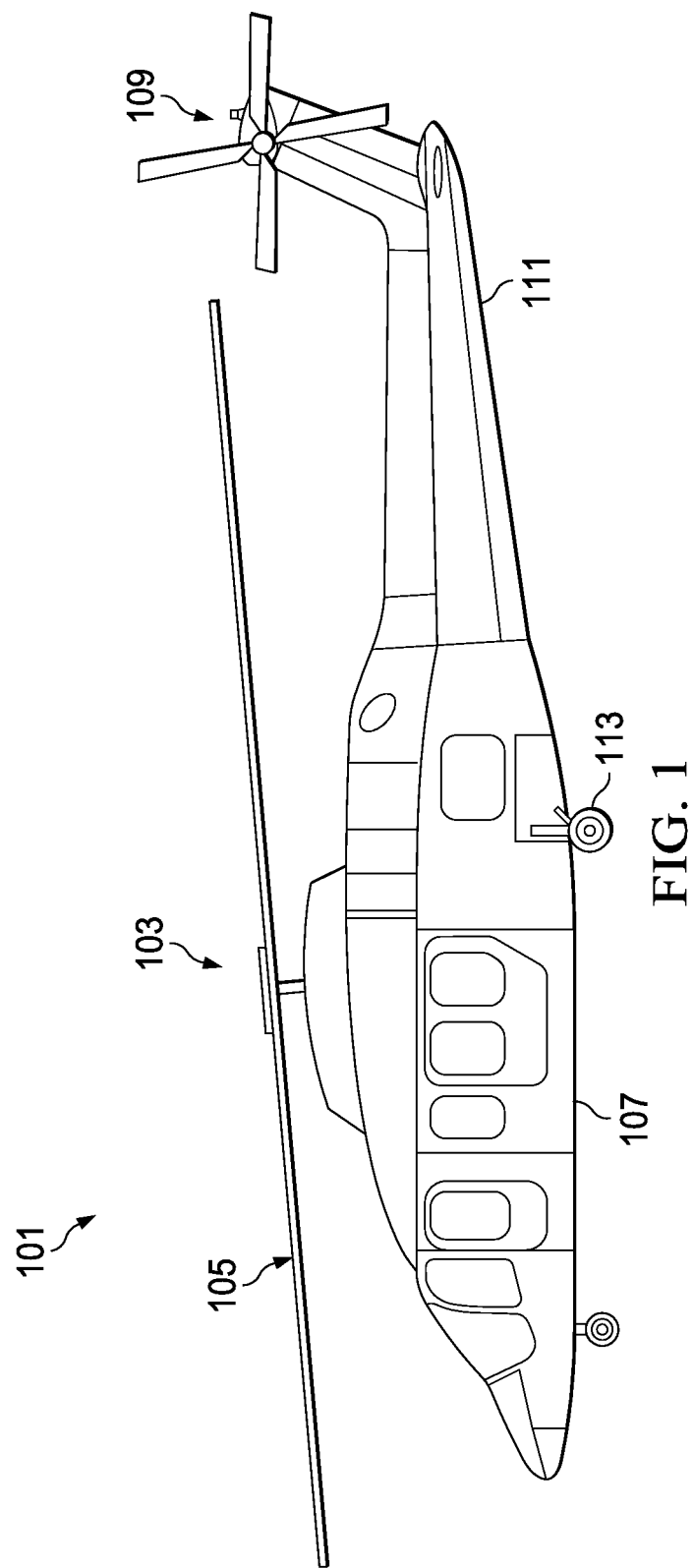
FIG. 1 is a side view of a rotorcraft, according to an example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be selectively controlled in order to selectively control direction, thrust, and lift of rotorcraft 101. Rotorcraft 101 further includes a fuselage 107, anti-torque system 109, and an empennage 111. Rotorcraft 101 further includes a landing gear system 113 to provide ground support for the aircraft. It should be appreciated that rotorcraft 101 is merely illustrative of a variety of aircraft that can implement the embodiments disclosed herein. Other aircraft implementations can include hybrid aircraft, tilt rotor aircraft, unmanned aircraft, gyrocopters, and a variety of helicopter configurations, to name a few examples. It should be appreciated that even though aircraft are particularly well suited to implement the embodiments of the present disclosure, non-aircraft vehicles and devices can also implement the embodiments.

Figure 2:
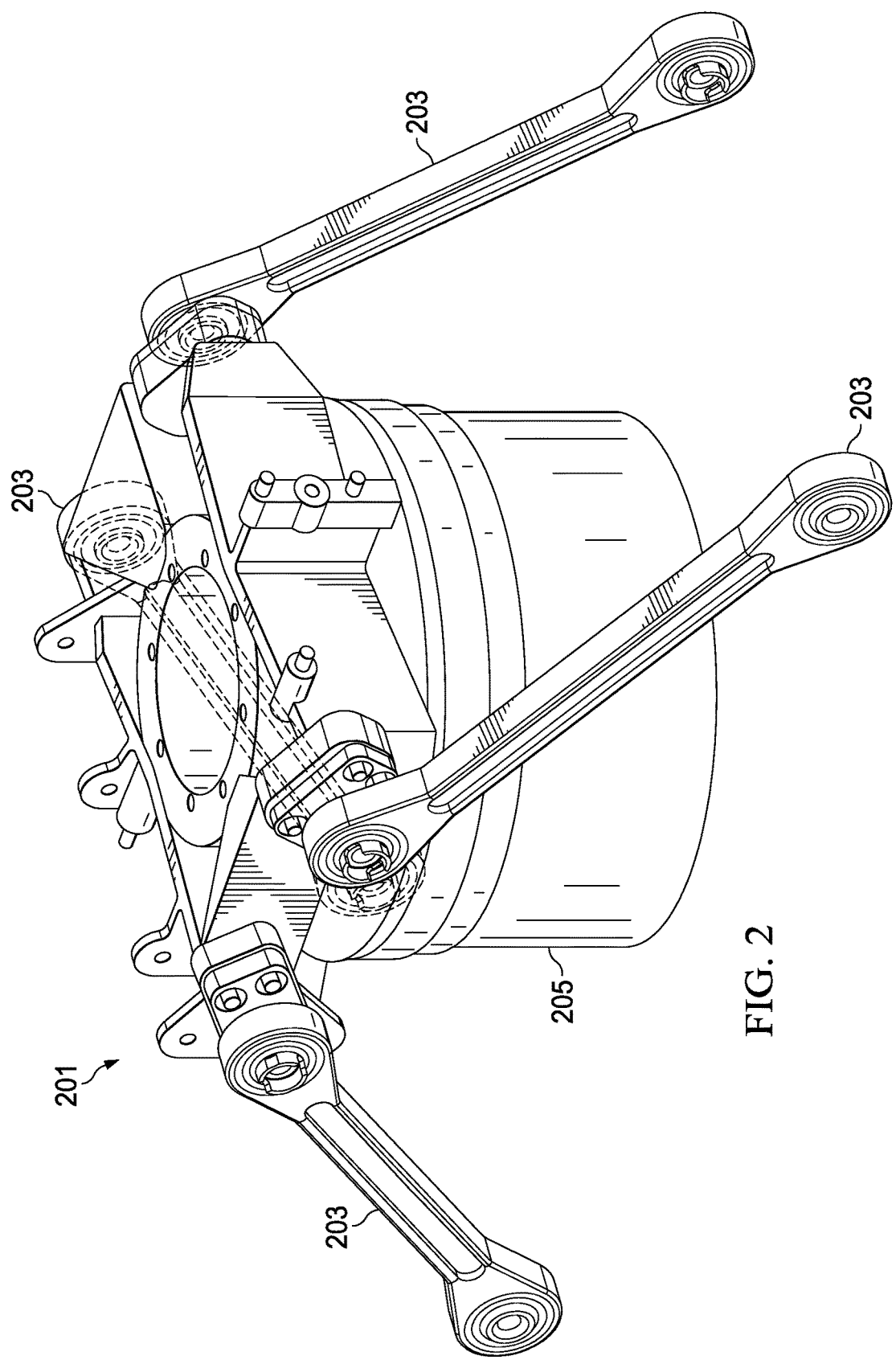
FIG. 2 is perspective view of a gearbox mount system for a rotorcraft, according to an example embodiment.

Referring now also to FIG. 2 in the drawings, mount system 201 for supporting a gearbox 205 is illustrated in further detail. Mount system 201 can include a plurality of links 203 that support the gearbox 205 to a pylon or other aircraft structure.

Figure 3:
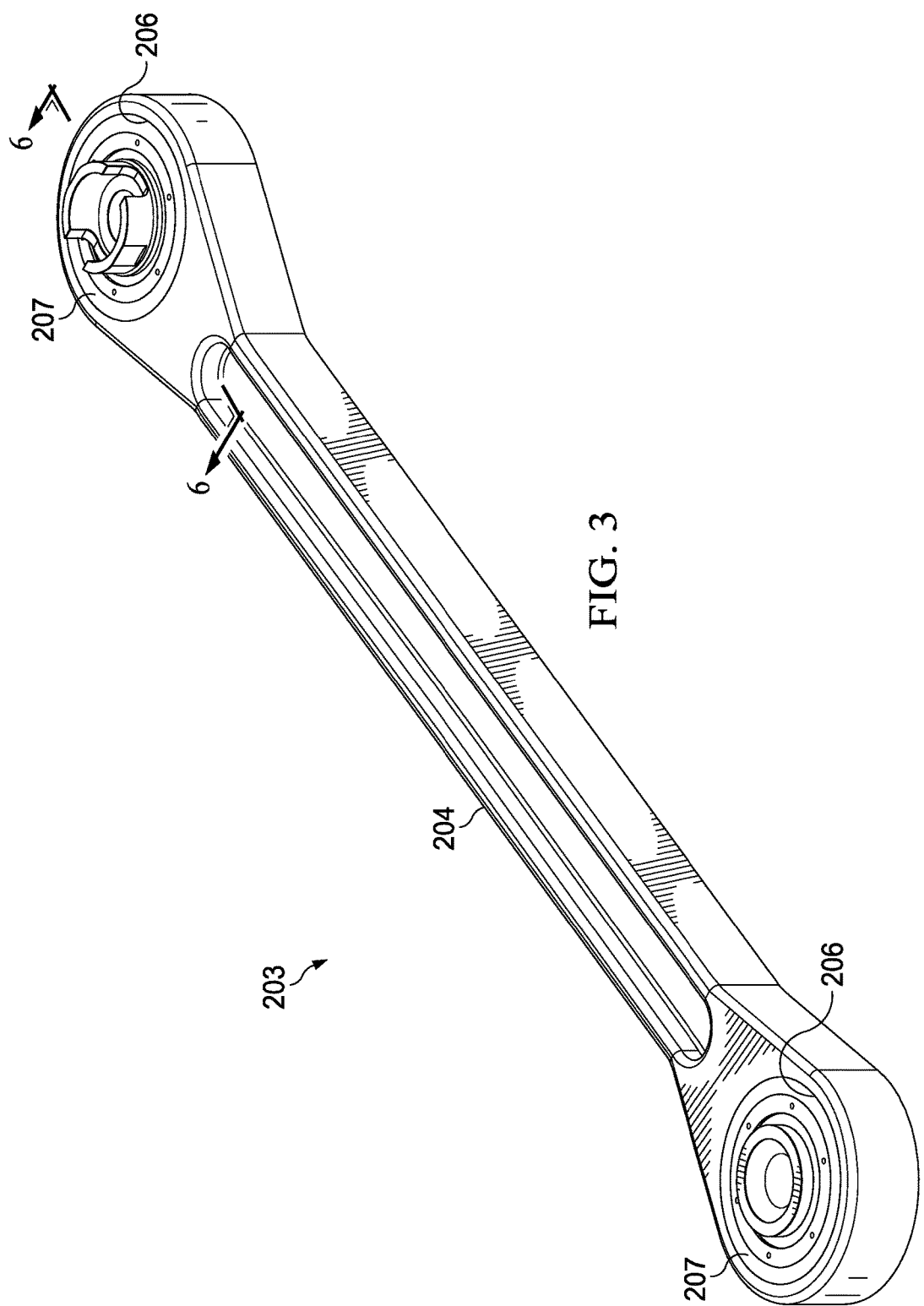
FIG. 3 is a perspective view of a link for a rotorcraft, according to an example embodiment.

Referring now also to FIG. 3, link 203 is illustrated in further detail. Link 203 can include a body member 204 having an aperture 206 for each bearing assembly 207. In the illustrated embodiment, a bearing assembly 207 is located near each end of body member 204. Each end of body member can have a thickness with aperture 206 therethrough. It should be appreciated that link 203 is merely exemplary of the wide variety of structures on which bearing assembly 207 can be utilized. Furthermore, the wide variety of structures can include any member for which an attachment thereto is desired. The member can be configured with an aperture so that bearing assembly 207 can be coupled thereto, as discussed further herein.

Figure 6:
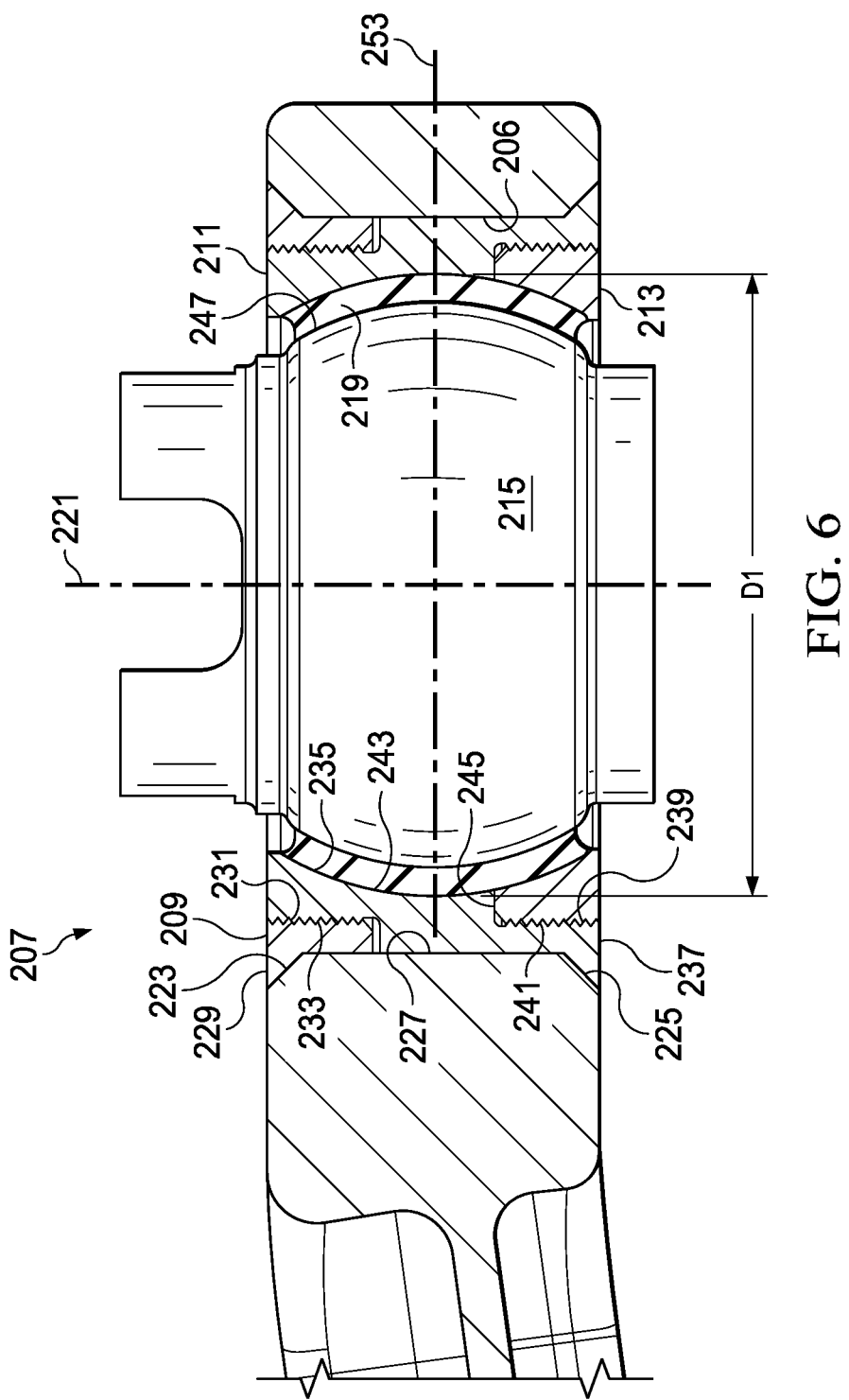
FIG. 6 is a cross-section view taken at section lines 6-6 in FIG. 3, according to an example embodiment.

Referring now also to FIGS. 4-6, bearing assembly 207 is illustrated in further detail. Bearing assembly 207 includes a top retainer 209, a center retainer 211, and a bottom retainer 213. Bearing assembly 207 also includes a spherical ball 215 with an attachment hole 217 located therethrough. Inner spherical surfaces of center retainer 211 and bottom retainer 213 are bonded to an elastomeric member 219. Elastomeric member 219 is also bonded to the outer spherical surface of spherical ball 215.

Elastomeric member 219 is a resilient member that is configured to resiliently shear to account for operationally induced misalignment. The misalignment can be from a steady state load, such a torque load from the rotor mast, or an oscillatory vibratory load from the rotor system, to name a few examples. Over time, the elastomeric member 219 can become worn and need replacement. One unique advantage of the bearing assembly 207 is how the components are configured to allow for disassembly and replacement of one or more components, such as the elastomeric member 219.

Referring now particularly to FIG. 6, the components of bearing assembly 207 are configured to have a common centerline axis 221. Aperture 206 has a central diameter surface 227 with an upper chamfer 223 and a lower chamfer 225. Top retainer 209 includes a top flange 229 and a body portion having a female thread set 231 on an interior surface. An outer diameter surface of the body portion of top retainer 209 is configured to lie adjacent to the central diameter surface 227 of aperture 206.

Center retainer 211 includes a male thread set 233 configured to threadingly engage with female thread set 231 of top retainer 209. Center retainer 211 includes a concave spherical surface 235 that partially provides the requisite concave spherical surface. Center retainer 211 also includes a bottom flange 237 and a female thread set 237. An outer diameter surface of the body portion of center retainer 211 is configured to lie adjacent to the central diameter surface 227 of aperture 206.

Bottom retainer 213 includes a male thread set 241 configured to threadingly engage with female thread set 239 of center retainer 211. Bottom retainer 213 also includes a concave spherical surface 243 that with concave spherical surface 235 of center retainer 211 that completes the desired requisite concave spherical surface. Bottom retainer 213 abuts against a shelf surface of center retainer 211 at an abutment 245.

In one embodiment, elastomeric member 219 is rubber that is vulcanized into the void between the collective concave spherical surface formed by concave spherical surfaces 235 and 243, as well as the concave spherical surface 247 of spherical ball member 215.

One unique feature of bearing assembly 207 is the ease of which it can be installed into link 203, or any other desired structure. One method of assembling bearing assembly 207 includes inserting spherical ball member 215 into the opening of center retainer 211 having a diameter D1. One key feature of bearing assembly 207 is that diameter D1 is larger than the greatest diameter of spherical ball member 215. Next in the assembly process, bottom retainer 213 is threaded onto center retainer 211 and until spherical surface 243 of bottom retainer 213 aligns with spherical surface 235 of center retainer 211. In one example embodiment, spherical surface 243 of bottom retainer 213 is aligned with spherical surface 235 of center retainer 211 when the bottom retainer 213 is pressed against center retainer 211 at abutment 245. A plurality of holes 249 (shown in FIG. 5), or other features, can be utilized by a tool for applying torque to bottom retainer 213.

Next, a tool can be utilized to centrally locate spherical ball member 215 within the assembly of center retainer 211 and bottom retainer 213 during an application of elastomeric member 219. In one example embodiment, vulcanized rubber is injected into the space between the concave spherical surface of center retainer 211 and bottom retainer 213 and the convex spherical surface of spherical ball member 215. The vulcanized rubber can flow between the threads of center retainer 211 and bottom retainer 213, thus locking or bonding the threads in place. Additional channels in bottom retainer 213 can be utilized to aid in the directional flow of the vulcanized rubber into the threads. One key advantage of bearing assembly 207 is that the elastomeric member 219 can be formed without the presence link 203, or other structure that utilizes bearing assembly 207. As such, a bearing assembly 207 can be replaced without having to send an entire structure, such as a link 203, to a facility for injection of vulcanized rubber to form elastomeric member 219.

Once the vulcanized rubber injection process is completed to formed elastomeric member 219, the assembly of center retainer 211, bottom retainer 213, elastomeric member 219, and spherical ball member 215 form a cartridge that can easily be installed on any variety of structures. Installation of the cartridge can include first inserting the cartridge into aperture 206. In one example embodiment, an adhesive is applied to the outer surface and threads of center retainer 211, prior to insertion into aperture 206. Next, top retainer 209 is inserted at the opposite end of aperture 206 and threaded onto center retainer 211. A plurality of holes 251 (shown in FIG. 4), or other features, can be utilized by a tool for applying torque to top retainer 209. Also, holes 249 in center retainer 211 can be utilized by a tool for hold the assembly in place while a torque is applied to top retainer 209. The flange 209 of top retainer 209 and flange 237 of bottom retainer act to center the components along centerline axis 221 and centerline axis 253 by forced alignment with chamfers 223 and 225.

The embodiments of the present disclosure include significant advantages over conventional bearing assemblies. One example advantage is that the design prevents the entire bearing housing structure to be acquired for vulcanization of the rubber directly thereto, rather the elastomeric rubber can be injected into a smaller component that can be ganged together during the injection process to reduce manufacturing expense, increase production count, and consume less space in the manufacturing facility. Another example advantage is that the design of the bearing assembly provides alignment and good bonding between the elastomeric and the structural housing.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:
1. A bearing assembly comprising:
a middle retainer having a first concave spherical surface;
a bottom retainer having a second concave spherical surface;
a spherical ball member comprising a hole configured for coupling to a member; and
an elastomeric member bonded to the first concave spherical surface, the second concave spherical surface, and an outer surface of the spherical ball member;
wherein the middle retainer and the bottom retainer axially overlap each other and wherein the middle retainer extends axially and upward beyond a top end of the elastomeric member and axially and downward beyond a bottom end of the elastomeric member; and wherein regardless of the position of the spherical ball member relative to the middle retainer, the spherical ball member is biased by the bonded elastomeric member toward an only unbiased position in which a central axis of the hole of the spherical ball member lies substantially coincident with a central axis of the middle retainer.

2. The bearing assembly according to claim 1, further comprising:
a top retainer in thread engagement with the middle retainer.

3. The bearing assembly according to claim 1, wherein the bottom retainer and the middle retainer are threadingly engaged.

4. The bearing assembly according to claim 1, wherein the elastomeric member comprises a rubber material.

5. The bearing assembly according to claim 1, wherein the middle retainer comprises a first chamfer.

6. The bearing assembly according to claim 2, wherein the top retainer comprises a second chamfer.

7. A structure comprising:
a body member having a first surface and a second surface which define a thickness therebetween;
an aperture through the body member;
a top retainer;
a middle retainer having a first concave spherical surface;
a bottom retainer having a second concave spherical surface;
a spherical ball member comprising a hole configured for coupling to a member; and
an elastomeric member bonded to the first concave spherical surface, the second concave spherical surface, and an outer surface of the spherical ball member;
wherein the middle retainer and the bottom retainer axially overlap each other and wherein the middle retainer extends axially and upward beyond a top end of the elastomeric member and axially and downward beyond a bottom end of the elastomeric member; and
wherein regardless of the position of the spherical ball member relative to the middle retainer, the spherical ball member is biased by the bonded elastomeric member toward a position in which a central axis of the hole of the spherical ball member lies substantially coincident with a central axis of the middle retainer.

8. The structure according to claim 7, wherein the top retainer is in thread engagement with the middle retainer.

9. The structure according to claim 7, wherein the bottom retainer and the middle retainer are threadingly engaged.

10. The structure according to claim 7, wherein the elastomeric member comprises a rubber material.

11. The structure according to claim 7, wherein the middle retainer comprises a first chamfer that mates with a chamfer feature between the aperture and the first surface.

12. The structure according to claim 7, wherein the top retainer comprises a second chamfer that mates with a chamfer feature between the aperture and the second surface.

13. A method of manufacturing a structure with a bearing assembly, the method comprising:
assembling a cartridge having a middle retainer, a bottom retainer, and a spherical ball member, by bonding an elastomeric member to a first concave spherical surface of the middle retainer, the second concave spherical surface of bottom retainer, and an outer surface of the spherical ball member, wherein the spherical ball member comprises a hole configured for coupling to a member;
inserting the cartridge into an aperture in the structure;
coupling the cartridge to a top retainer, thereby securing the top retainer and the cartridge in the aperture of the structure;
wherein the middle retainer and the bottom retainer axially overlap each other and wherein the middle retainer extends axially and upward beyond a top end of the elastomeric member and axially and downward beyond a bottom end of the elastomeric member; and
wherein regardless of the position of the spherical ball member relative to the middle retainer, the spherical ball member is biased by the bonded elastomeric member toward an only unbiased position in which a central axis of the hole of the spherical ball member lies substantially coincident with a central axis of the middle retainer.

14. The method according to claim 13, wherein the step of bonding the elastomeric member to the first concave spherical surface of the middle retainer, the second concave spherical surface of bottom retainer, and the outer surface of the spherical ball member includes vulcanizing a material into a void between first concave spherical surface of the middle retainer, the second concave spherical surface of bottom retainer, and the outer surface of the spherical ball member.

15. The method according to claim 13, wherein the step of bonding the elastomeric member to the first concave spherical surface of the middle retainer, the second concave spherical surface of bottom retainer, and the outer surface of the spherical ball member includes injecting a material into a void between first concave spherical surface of the middle retainer, the second concave spherical surface of bottom retainer, and the outer surface of the spherical ball member.

16. The method according to claim 13, wherein the step of bonding the elastomeric member to the first concave spherical surface of the middle retainer, the second concave spherical surface of bottom retainer, and the outer surface of the spherical ball member includes curing the elastomeric member.

* * * * *